United States Patent

[11] 3,585,618

[72] Inventor Alpheus F. Stansell
West Covina, Calif.

[21] Appl. No. 629,140
[22] Filed Apr. 7, 1967
[45] Patented June 15, 1971
[73] Assignee Burroughs Corporation
Detroit, Mich.

[54] MULTIPLE RECORDING HEADS USING COMMON POSITION CONTROL MANIFOLD IN DISC FILE MEMORY

13 Claims, 4 Drawing Figs.

[52] U.S. Cl. 340/174.1, 179/100.2
[51] Int. Cl. G11b 5/48, G11b 5/54, G11b 5/60
[50] Field of Search 340/174.1 E; 179/100.2 P

[56] References Cited

UNITED STATES PATENTS

| | | | |
|---|---|---|---|
| 3,205,503 | 9/1965 | Johnson et al. | 340/174.1 |
| 3,320,599 | 5/1967 | Billawala | 340/174.1 |

*Primary Examiner*—Bernard Konick
*Assistant Examiner*—William F. White
*Attorney*—Christie, Parker and Hale ABSTRACT: A manifold for use in positioning magnetic transducers adjacent a rotating disc coated with a magnetic material. A pressure source communicates with two or more transducers through the manifold to advance the transducers toward the disc surface to provide proper spacing between the transducers and the surface. Separation between the disc and transducers is maintained by an air bearing created at the surface of the rotating disc.

INVENTOR
ALPHEUS F. STANSELL

BY
Christie, Parker & Hale
ATTORNEYS

MULTIPLE RECORDING HEADS USING COMMON POSITION CONTROL MANIFOLD IN DISC FILE MEMORY

BACKGROUND OF THE INVENTION

This invention relates to electromagnetic transducers and more particularly to electromagnetic read and write heads which float on a thin film of air adjacent a moving magnetic recording surface for reading and writing information on the recording surface.

In the recording and recovery of information stored on surfaces coated with magnetic materials, such as memory storage discs it is a frequent practice to bring magnetic transducers (read/write heads) in close proximity of the disc for the recording and recovery of said information. With increasing demands being made on the capacity and speed of operation of computers, the density of material recorded on such discs has increased significantly. IN order to obtain a faithful recording and reproduction of the information recorded thereon, as the disc moves in relation to the read/write heads, extremely close spacing between the discs and the transducers is required, typically on the order of 60 microinches with ±10 microinches tolerance. To accomplish the positioning of heads with such minimal spacing, one technique which has been adapted is to use an air bearing created between the disc and the transducer to "float" the heads in position relative to the disc. This air bearing allows the transducers to be brought to the required close proximity of the disc while diminishing the risk of physical contact between the two which could result in damage to either the head or the disc.

One specific illustration of the manner in which magnetic transducers are closely positioned adjacent such a rotating disc is described in U.S. Pat. No. 3,320,599 and assigned to the assignee of the present application. To that end a transducer mounting is pivoted into position between two magnetic recording discs. The mounting is arranged to accommodate a plurality of magnetic transducers spaced at various radial positions relative to the axis of the discs, the radial spacings of the transducers corresponding to the tracks recorded on the disc. Such heads are normally oriented in a back to back relationship between the two discs and in a face to face relationship on opposite sides of the same disc. Each transducer is mounted in a receptacle in the transducer mounting which defines a chamber to which fluid pressure is communicated.

When the transducer mountings are positioned between the magnetic discs and the discs are rotating at proper speed, fluid pressure is admitted into the chamber causing the face to face transducer pairs to advance in opposite directions toward the disc with which both are associated in order to obtain proper spacing between the discs and the heads. Because the angular velocity of a specific point on the disc increases as distance from the axis of rotation increases, the air bearing pressure is greater as the distance from the axis increases and hence greater pressure must be exerted on the transducer pairs adjacent the periphery of the magnetic disc in comparison to the pressure supplied to the transducer pairs located most closely adjacent to the axis of rotation. To apply the proper amount of force, the transducer pairs for a given radial spacing are connected to a pressure regulator which is in turn connected to the source of fluid pressure. Each of the pressure regulators is then independently adjusted to produce the proper transducer-to-disc spacing for the radial position with which it is associated.

Inherent in the approach just outlined above is the necessity of a provision of a number of air lines, pressure control devices and accessory hardware in order to maintain the gap spacing the same at all radial positions along the disc surfaces.

SUMMARY OF THE INVENTION

The present invention is used in a system for positioning a plurality of magnetic transducers adjacent a rotating surface coated with a magnetic material. Separation between the rotating surface and each of said transducers is obtained by means of an air bearing created between the two. The invention comprises the improvement wherein a transducer mounting is provided having a plurality of receptacles for receiving a plurality of said transducers and an integral fluid pressure conduit network which communicates with each of the plurality of receptacles in the mounting and with a port adapted to be connected to a source of fluid pressure. A flexible diaphragm is disposed on each of the receptacles and a plunger is operatively connected with each diaphragm. Each of the plungers is adapted to exert a force on a transducer mounted in the receptacle to cause the transducer to advance toward the rotating disc.

The present invention simplifies the pressurized head actuating system described in the above-identified application by the provision of a single pneumatic manifold which is an integral part of the read/write head mounting. By providing a manifold which is integral with the head mounting, the number of individual air lines previously required to supply pressure to transducers located at various radial positions is reduced. A similar reduction in pressure regulating devices and accessory hardware is also obtained. One important result of such a reduction is a lower manufacturing cost. Where it is necessary to vary the spacing between the transducer and the magnetic disc the variation in pressure on the transducer is accomplished by varying the diameter of the plungers and the diaphragms in each of the various receptacles to increase or decrease the force exerted on the transducers. Under the previous arrangement, individual pressure regulators were adjusted to control the amount of pressure since all plungers and diaphragms were of uniform diameter.

These and other advantages of the present invention will be better understood by reference to the following FIGS. in which.

Figures 1, 2:
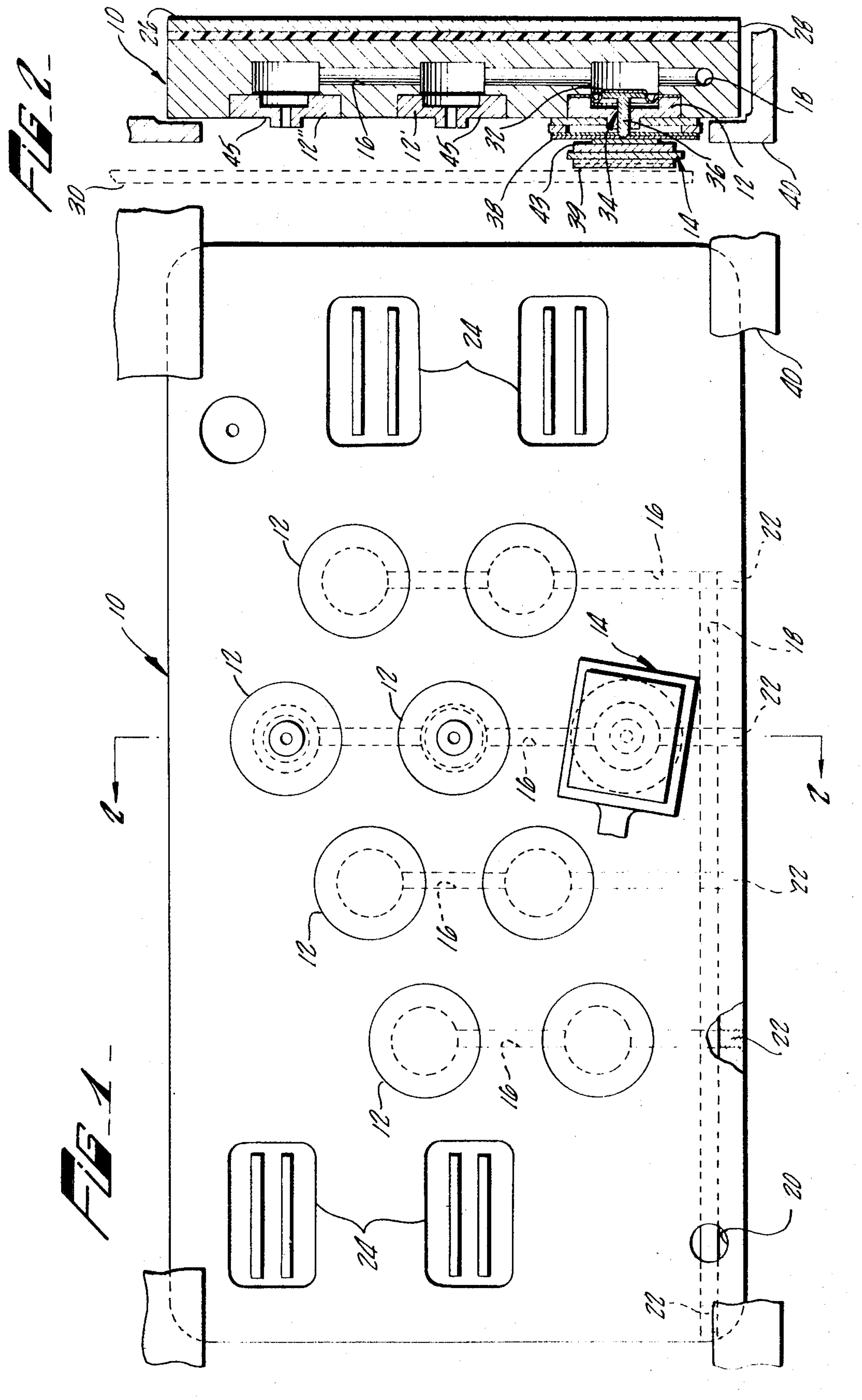
FIG. 1 is a plan view of a manifold utilizing one variation of a network for supplying pressure to the various transducer receptacles.
FIG. 2 is a section view taken along lines 2–2 of FIG. 1.

DETAILED DESCRIPTION referring now to FIGS. 1 and 2, there is shown a head mounting and actuating manifold 10 according to the present invention. The manifold includes a plurality of receptacles 12 adapted to receive magnetic transducers 14 which are suitable for use as read and write heads in a magnetic recording system.

Interconnecting each of the receptacles 12 are a series of conduits 16 extending through the manifold 10. Conduits 16 communicate with a common conduit or channel 18 which is connected to a port 20 which is adapted to be connected to a source of fluid pressure (not shown). Conduits 16 and 18 are sealed by means of bonded plugs 22 at the ends thereof to prevent leakage of fluid pressure admitted into the network. Electrical connections to the heads mounted in the manifold are established by means of connectors 24 located at spaced intervals on the surface of the manifold. By suitable electrical circuitry these connectors are connected to circuit board 26 disposed on the side of the manifold 10 opposite the receptacles for the magnetic transducers. Interposed between circuit board 26 and the manifold is a layer of insulating material 28 which serves as a sealing gasket for bonding the circuit board to the manifold and as an electrical insulator for insulating the board from the manifold.

As shown in FIG. 2, receptacles 12 are adapted to mount magnetic transducers such as transducer 14 and to position such a transducer closely adjacent a rotating surface 30 such as a disc having a coating of magnetic material thereon. Such a disc may be used, for example, in the system memory of a digital computer. For purposes of achieving a dynamic balance, a second transducer (not shown) is normally located on the opposite side of disc 30 in a face to face relationship with transducer 14. Disposed within receptacle 13 is a flexible diaphragm 32 which serves to seal receptacle 12 and which is in fluid pressure communication with conduit 16. A plunger 34, mounted on diaphragm 32, is adapted to advance and retract with respect to the rotating disc. The head 36 of plunger 34 is arranged such that it bears against a transducer support 38. When the disc is rotating at proper speed, pressure is admitted to the fluid pressure network via conduit 18 and force is exerted against diaphragm 32 causing plunger 34 to advance. This, in turn, causes transducer 14 to advance toward the disc until the desired spacing has been achieved.

The head mount and actuating manifold 10 is attached to a mounting 40 shown in section of FIG. 2. In one embodiment where the assembly is used with a system employing two or more discs, mounting 40 is connected to a mounting axis (not shown) to permit the entire assembly to be rotated relative to the cylinder of revolution defined by the magnetic discs. When not in use or when rearrangement of the transducer configuration is desired, the actuating manifold can be rotated about the mounting axis out of the cylinder defined by the discs. In a single disc embodiment the actuating assemblies are directly removable from their positions on opposite sides of the disc.

As shown in FIG. 2, the various transducers are adapted to be advanced in a right to left direction toward disc 30. The embodiment shown in FIG. 2 is illustrative only and it is contemplated that a manifold having a plurality of receptacles opening on each side thereof can be used. In such an embodiment the common manifold communicates with all receptacles to cause the transducers mounted therein to advance both directions simultaneously.

As shown in FIG. 2, transducer 14 is mounted near the outer extremity of disc 30. As discussed in greater detail in U.S. Pat. No. 3,320,599 the various transducers are provided with a bearing surface 39 and a back surface 43. Surface 39 is beveled in the direction of disc rotation to "float" the transducer on the air bearing created between the disc and the transducer.

As is well known, the angular velocity of a fixed point on the disc increases as distance from the axis of rotation increases. Due to the greater angular velocity the air bearing created between the surface of disc 30 and the surface of transducer 14 has a greater pressure and hence resists the force exerted by plunger 34 on transducer 14. Where the resisting force of the air bearing is sufficiently great, an increased amount of force exerted by diaphragm 32 and plunger 34 is obtained by adjusting the diameter of the diaphragm and plunger. Accordingly, as shown in FIG. 2, the diameter of diaphragm 32 and plunger 34 is larger than those to be mounted in receptacles 12' and 12'', as illustrated by the supporting plugs 45 disposed in those receptacles. Hence the total force exerted on diaphragm 32 is greater than the total force to be exerted on a diaphragm placed in receptacle 12'.

Figure 3:
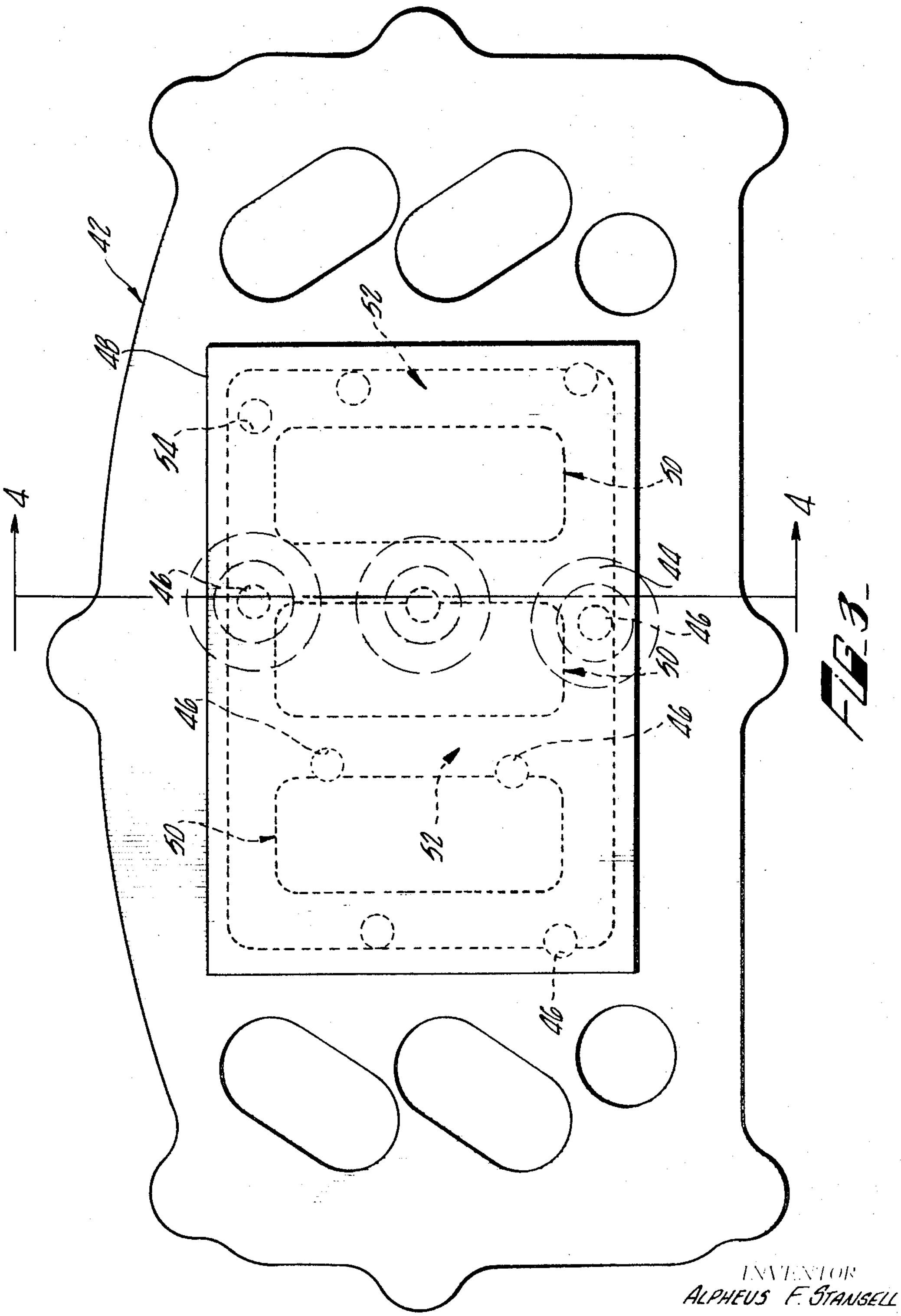
FIG. 3 is a plan view of an alternate embodiment of the present invention.
Figure 4:
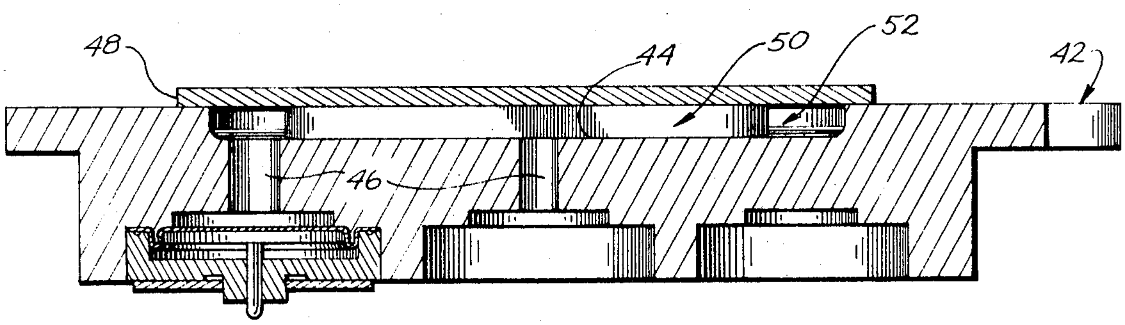
FIG. 4 is a section view taken along lines 4–4 of FIG. 3.

An alternate embodiment of the actuating manifold is shown in FIGS. 3 and 4. In this embodiment a manifold 42 is provided with a recessed area 44 located approximately in the center thereof. A plurality of ports 46 pass through manifold 42 and open into the recessed area. Recess 44 is provided with a series of lands 50 and grooves 52 arranged in a predetermined pattern. Ports 46 communicate with receptacles (not shown) located on the other side of the manifold which are adapted to receive magnetic transducers. Disposed over recess 44 is a plate 48 which is fastened to the manifold at the periphery of recess 44 and sealed to the periphery and lands 50 to enclose a fluid pressure tight volume between the plate and the grooves in recess 44. An access port 54 is provided in plate 48 and is adapted to be connected to a source of fluid pressure for admitting pressure into the area defined by the lands and grooves of recess 44 and plate 48.

A particular advantage of the embodiment shown in FIG. 3 is that the head actuating manifold can be cast in one configuration. The transducer actuating ports 46 and transducer receptacles for the configuration desired are then machined into the common casting. For a different application a different pattern of ports and receptacles are drilled into that casting. After sealing by a mating engagement with plate 48, fluid pressure is connected to and communicated through port 54 into the grooved area 52.

What I claim is;

1. A common manifold for communicating fluid pressure to a plurality of magnetic transducers comprising:
   - a transducer mounting plate having a plurality of receptacles on one side and a recessed area on the opposite side, each of said receptacles being adapted to receive a transducer and communicating with a port extending through the mounting plate, said recessed area defining a combination of lands and interconnecting grooves having a predetermined pattern, the ports extending from said receptacles communicating with the grooves in said recessed area;
   - a manifold plate mounted on said transducer mounting plate is sealed mating engagement with said lands and the periphery of said recessed area, said plate being provided with an aperture for the admission of fluid pressure into the grooved areas; and
   - means for connecting said plate aperture to a source of fluid pressure whereby fluid pressure communication is established with each of the receptacles in the mounting plate.
2. In a storage apparatus including a disc surface rotating in a fluid atmosphere for forming a fluid bearing adjacent thereto, an assembly comprising:
   - a plurality of read or write head assemblies associated with said disc surface, said assemblies being located at different radial spacings and angles with respect to the axis of the disc and each of said heads having a surface constructed for floating on the fluid bearing;
   - a fluid actuated manifold and mounting structure common to all of said read and write head assemblies for applying a force thereto to move the assemblies into a floating position on the fluid bearing;
   - a single adjustable regulating device for coupling a source of fluid pressure to the fluid actuated manifold and mounting structure for controlling the force applied thereby to the head assemblies and thereby simultaneously controlling the head to surface spacing of all heads; and
   - a receptacle for each head assembly in the manifold and mounting structure, the dimensions of each said receptacles being selected so as to apply a varying amount of force from the pressure source, the amount of force varying according to the radial spacing of the head assembly from the disc surface axis.
3. In an apparatus for positioning a first transducer at a first radial spacing and a second transducer at a second greater radial spacing relative to the axis of rotation of a rotating surface, separation between the surface and each transducer being obtained by means of an air bearing created between the transducer and the rotating surface, the improvement comprising:
   - a transducer mounting and common manifold housing positioned adjacent the rotation surface having a first chamber opening into the surface of the housing adjacent the rotating surface at said first radial spacing, a second chamber opening into the surface of the housing adjacent the rotating surface at said second greater radial spacing, the first chamber opening having a first area and the second chamber opening having a second greater area, and a conduit communicating between the two chambers;
   - port means for communicating transducer actuating pressure from the exterior of the housing to the conduit;
   - a flexible diaphragm disposed in each of said chamber; and
   - a plunger operatively connected with each of said diaphragms, said plungers being adapted to exert a force on a transducer mounted in said chamber to advance said transducer toward the rotating surface.

4. A transducer mounting and common manifold structure according to claim 3 wherein the plurality of chambers are located at various angular and radial spacings relative to the axis of the rotating surface.

5. A storage apparatus comprising:
- a recording disc rotatable about an axis, each side of said disc having a recording surface;
- a plurality of read/write heads for each recording surface, said heads each having a back side and a bearing surface which is constructed for floating on an air bearing formed by said disc surfaces when rotating, said heads being positioned at different radial spacings and angles relative to the axis of the recording disc, said heads being arranged in pairs in a face to face relationship on opposite sides of the disc;
- a head mounting and actuating structure positioned adjacent a side of the recording disc comprising:
- a common manifold within the structure for the heads at all spacings and angles, the manifold communicating with each of a plurality of chambers, each chamber being operatively connected to a different head, the dimensions of said chambers differing according to the axis to chamber spacing;
- a fluid actuated plunger for each of the heads, said plunger extending out of said chamber toward the back of its corresponding head;
- a diaphragm located in each chamber on the side of the plunger opposite the associated head for actuating the plunger in response to a fluid pressure applied thereto to move all of the heads simultaneously into a floating position in a fluid bearing formed by the corresponding disc surface; and
- a single adjustable means for coupling pressure to the manifold thereby allowing the fluid pressure applied to all heads to be controlled simultaneously.

6. Storage apparatus according to claim 5 wherein a plurality of discs and actuating means are provided such that actuating assemblies positioned adjacent one interior recording surface are located in a back to back relationship with assemblies for adjacent discs.

7. Storage apparatus according to claim 6 wherein said actuating means is pivoted about an axis parallel to the axis of rotation of the magnetic discs and is removable from the cylinder of revolution defined by said discs.

8. In an apparatus for positioning a plurality of magnetic transducers located at various angular and radial positions adjacent a rotating surface coated with a magnetic material, separation between the surface and each transducer being obtained by means of an air bearing created between the transducer and the rotating surface, the improvement comprising:
- a transducer mounting and common manifold structure having a plurality of receptacles located at various angular and radial spacings relative to the axis of the rotating surface for receiving the plurality of said transducers and a fluid pressure distribution network integral with said structure, said network communicating with each of said plurality of receptacles;
- a single port in the structure communicating between the network and the exterior of the structure for the admission of pressure from a source;
- a flexible diaphragm disposed in each of said receptacles; and
- a plunger operatively connected with each of said diaphragms, said plungers being adapted to exert a force on a transducer mounted in said receptacle to advance said transducer toward the rotating surface, the dimensions of the receptacles and the diaphragms located at a given radial spacing being chosen such that an amount of force is applied to the transducer by the pressure source corresponding to the radial spacing of the transducer to produce the desired spacing between the rotating surface and the transducers.

9. An apparatus according to claim 8 wherein a source of a fluid pressure is connected to the fluid pressure admission port and means for regulating the pressure from the source is provided between the source and the port.

10. A transducer mounting according to claim 8 wherein the fluid pressure distribution network comprises a plurality of interconnecting conduits passing through the manifold and mounting structure and communicating between the pressure admission port and the receptacles.

11. A transducer mounting according to claim 10 wherein the mounting is a unitary casting and the fluid pressure distribution network comprises an intersection of lands, grooves and actuating ports in said casting, said lands and grooves intercommunicating between the pressure admission port and each of the transducer receptacles.

12. A transducer mounting according to claim 10 wherein the receptacles are cylindrical recesses and the diameter of the cylinders and diaphragms in the mounting receptacles located at a given radial spacing relative to the rotating surface axis are of a size that a different amount of force is applied to the transducer corresponding to the radial spacing of the transducer.

13. A transducer mounting according to claim 12 wherein the diameter of the cylinders and diaphragms is largest at a radial position nearest the outer edge of the disc and diminishes proportionally for transducer receptacles located interiorly of said outermost receptacles.